United States Patent [19]

Reece

[11] 4,415,910

[45] Nov. 15, 1983

[54] INK JET TRANSDUCER

[75] Inventor: John W. Reece, Ithaca, N.Y.

[73] Assignee: NCR Corporation, Dayton, Ohio

[21] Appl. No.: 342,256

[22] Filed: Jan. 25, 1982

[51] Int. Cl.³ .............................................. G01D 15/18

[52] U.S. Cl. .................................. 346/140 R; 251/141

[58] Field of Search .................. 346/140, 75; 251/139, 251/141

[56] References Cited

U.S. PATENT DOCUMENTS

| | | | |
|---|---|---|---|
| 2,951,894 | 9/1960 | Hirsch | 346/140 X |
| 3,116,964 | 1/1964 | Zenner | 346/140 |
| 3,656,169 | 4/1972 | Kashio | 346/75 X |
| 3,731,880 | 5/1973 | Williams | 251/141 X |
| 4,215,350 | 7/1980 | Mielke | 346/140 X |

FOREIGN PATENT DOCUMENTS

| | | |
|---|---|---|
| 782710 | 4/1968 | Canada . |
| 36295 | 9/1981 | European Pat. Off. . |
| 554308 | 6/1943 | United Kingdom . |

OTHER PUBLICATIONS

Hochberg et al.; Multinozzle Line Printer Using Electromagnetic Valving; IBM TDB, vol. 16, No. 2, Jul. 1973, pp. 467–468.

*Primary Examiner*—Joseph W. Hartary
*Attorney, Agent, or Firm*—J. T. Cavender; Wilbert Hawk, Jr.; George J. Muckenthaler

[57] ABSTRACT

An ink jet transducer operates on pressurized ink which is released on demand by action of an electromagnet operating to unseat a magnetic ball seated on the nozzle. Ink droplets are formed and are caused to travel in a path along the nozzle axis to impact on record media.

7 Claims, 5 Drawing Figures

INK JET TRANSDUCER

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members such as wires or the like and which are typically moved by means of an electromechanical system which may, in certain applications, enable a more precise control of the impact members.

The advent of non-impact printing as in the case of thermal printing, brought out the fact that the heating cycle must be controlled in a manner to obtain maximum repeated operations. Likewise, the control of ink jet printing in at least one form thereof, must deal with rapid starting and stopping movement of the ink fluid from a supply of the fluid. In each case, the precise control of the thermal elements and of the ink droplets is necessary to provide for both correct and high-speed printing.

In the matter of ink jet printing, it is extremely important that the control of the ink droplets be precise and accurate from the time of formation of the droplets to depositing of such droplets on paper or like record media and to make certain that a clean printed character results from the ink droplets. While the method of printing with ink droplets may be performed either in a continuous manner or in a demand pulse manner, the latter type method and operation is disclosed and is preferred in the present application as applying the features of the present invention. The drive means for the ink droplets is generally in the form of a crystal or piezoelectric type element to provide the high speed operation for ejecting the ink through the nozzle while allowing time between droplets for proper operation. The ink nozzle construction must be of a nature to permit fast and clean ejection of ink droplets from the print head.

In the ink jet printer, the print head structure may be a multiple-nozzle type with the nozzles aligned in a vertical line and supported on a print head carriage which is caused to be moved or driven in a horizontal direction for printing in line manner. The ink droplet drive elements or transducers may be positioned in a circular configuration with passageways leading to the nozzles.

Alternatively, the printer structure may include a plurality of equally-spaced horizontally aligned single nozzle print heads which are caused to be moved in back-and-forth manner to print successive lines of dots in making up the lines of characters. In this latter arrangement, the drive elements or transducers are individually supported along a line of printing.

Previous and current designs for drop-on-demand ink jet print heads are sensitive to the ingestion of air into or the presence of air in the supply of ink. Even a small air bubble can interrupt or fault the performance of transducers that expel ink droplets from a nozzle by means of pressure pulses created within an ink-filled chamber or channel.

It is proposed to provide an ink jet transducer or ink droplet drive element that operates, with the ink being in a condition under hydrostatic pressure, on the principle of an electromagnetic valve assembly for initiating and controlling the flow of ink droplets toward the record media.

Representative documentation in the field of ink jet transducers or drive elements includes U.S. Pat. No. 3,424,198, issued to A. R. Erbach on Jan. 28, 1969, which discloses a combined pressure regulating and pressure release valve having a solenoid driven carriage and a pair of balls rotatably mounted in the carriage wherein one ball always seals an orifice except while the carriage is being moved from one position to another position.

U.S. Pat. No. 4,152,710, issued to M. Matsuba et al. on May 1, 1979, discloses an ink liquid supply system having a reservoir and an electromagnetic cross valve for controlling the flow direction of the ink, and a drain tank with a ball valve functioning to absorb the rapid flow of the ink.

U.S. Pat. No. 4,183,031, issued to E. L. Kyser et al. on Jan. 8, 1980, discloses an ink supply system with a pressure sensor and a valve operated by the sensor and integrally incorporated into the print head to meter the flow of ink thereto. The valve arrangement uses a piezoelectric activated beam which opens and closes the gate valve comprising a plug secured to the beam, a diaphragm and a seal along with a valve seat through which passes a valve orifice.

SUMMARY OF THE INVENTION

The present invention relates to ink jet printers, and more particularly, to means for initiating ink droplets and propelling such droplets along a path from an ink nozzle onto paper or like record media. The transducer or drive element is provided to discharge and to propel controlled amounts of ink for purposes of marking, encoding or printing on the record media.

The principle and the use of hydrostatic pressure, rather than an acoustic pulse, is realized to propel the ink along a channel or passageway and out through an ink nozzle in the formation of ink droplets to be projected onto the paper. Since the ink droplets are impelled by hydrostatic pressure, the droplet formation and projection is not affected by air bubbles that may lodge in the ink line or chamber, whereas ink bubbles constitute a critical limitation to piezo-electrically-impelled droplet generation. The required force and motion is provided by electromagnetic action on a ball element which is caused to be moved to and from a seat portion of a valve assembly. The valve assembly comprises the ball which is made of magnetic material and which operates with the seat portion upstream of a nozzle and made of non-magnetic material. The ball is seated on the seat portion during stand-by or non-printing conditions by reason of hydraulic pressure acting on the ball. When the electromagnet is pulsed, a momentary magnetic field is generated and the ball experiences a magnetic force in opposition to the hydraulic pressure in sufficient quantity to move the ball from the seat portion. When the ball is momentarily off the seat portion, a controlled amount of ink flows past the ball along the channel and out through the nozzle. The flow of ink produces a drag force on the ball due to the combined action of viscosity and pressure distribution and which force returns the ball onto the seat and an ink droplet is formed and propelled toward the record media.

A second embodiment or modification of the invention employs valve means wherein a central core is made of magnetic material and forms the central pole of the electromagnet. The plunger component of the valve is attracted toward the central core when the magnet is actuated, and is returned to the valve seat by spring action when the magnetic field is released, thereby ejecting fluid through the nozzle in the process of forming ink droplets.

In view of the above discussion, the principal object of the present invention is to provide means for discharging and propelling controlled amounts of ink for purposes of marking or printing on record media.

Another object of the present invention is to provide control means in an ink jet recording device for substantially reducing or eliminating the adverse effects of air bubbles in the controlled amounts of ink.

An additional object of the present invention is to provide valve means for forming and propelling droplets of ink along a path and onto the record media.

A further object of the present invention is to provide a valve assembly having a magnetic element movable to and from a valve portion by actuation of magnetic means to control the flow of ink from the nozzle of the print head.

Additional advantages and features of the present invention will become apparent and fully understood from a reading of the following description taken together with the annexed drawing.

DESCRIPTION OF THE PREFERRED EMBODIMENT

Figure 1:
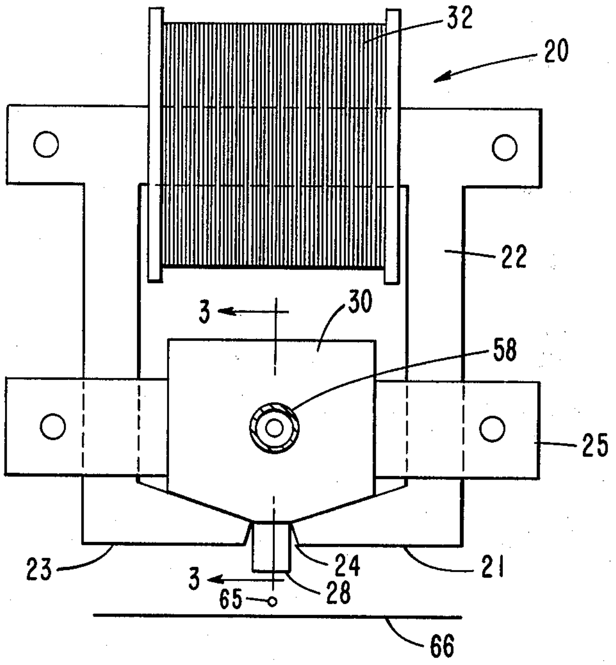
FIG. 1 is a top view of an ink jet transducer incorporating the subject matter of the present invention.
Figure 2:
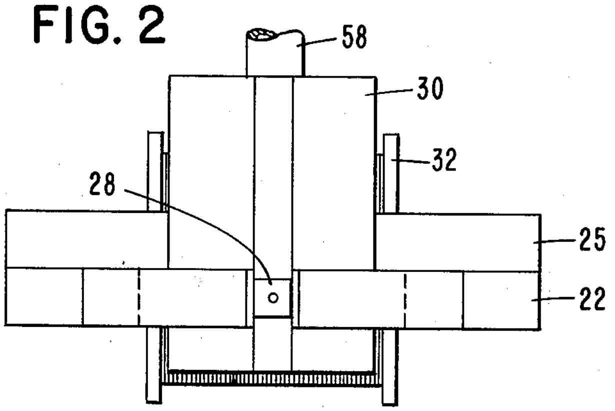
FIG. 2 is a frontal view of the transducer shown in FIG. 1.

FIGS. 1 and 2 show an arrangement of a drop-on-demand type ink jet transducer wherein an electromagnet, generally designated as 20, includes a frame 22 of singular construction which is open at one end and has a flange forming pole portions 21 and 23 (FIG. 4) terminating in pole faces 26. The flange portions 21 and 23 define an aperture 24 for receiving a nose portion 28 of a central housing member 30 which is formed to fit snugly at the surfaces of the pole portions. The frame 22 is made of magnetic material and is constructed in multipart or laminated manner to facilitate assembly of the several parts of the magnet for use in the operation of the transducer. The housing member 30 is made of plastic and is supported from a strap or bar member 25 suitably secured to the frame 22. Mounting holes are provided in the frame 22 and the strap 25 for attachment to a carrier (not shown). A coil 32 including a bobbin and associated wiring is positioned on either side of and is suitably supported from the frame 22 and has a portion thereof within the walls or side members of the frame.

Figure 3:
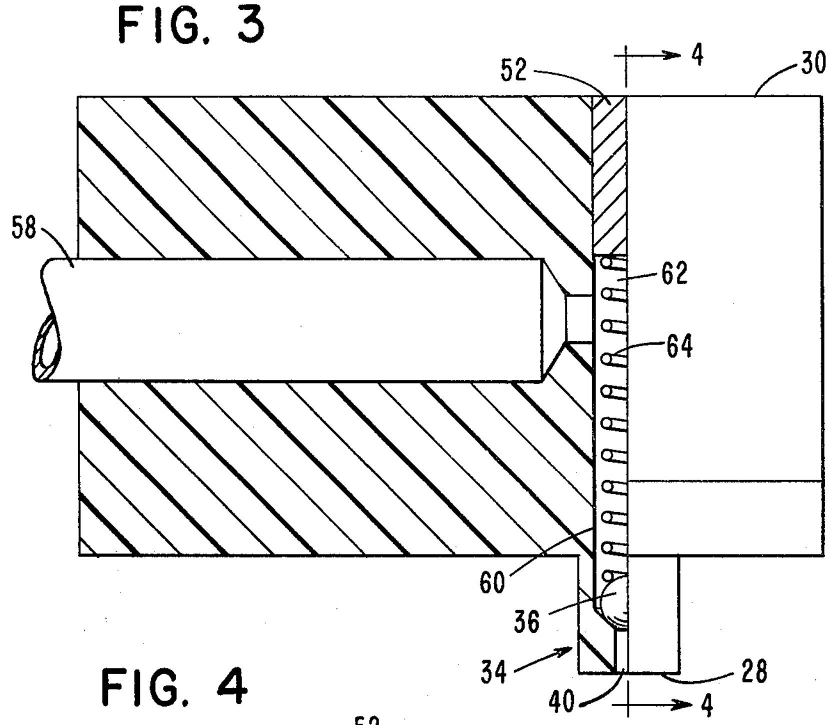
FIG. 3 is an enlarged quarter-section view of the valve assembly taken along the line 3—3 of FIG. 1.
Figure 4:
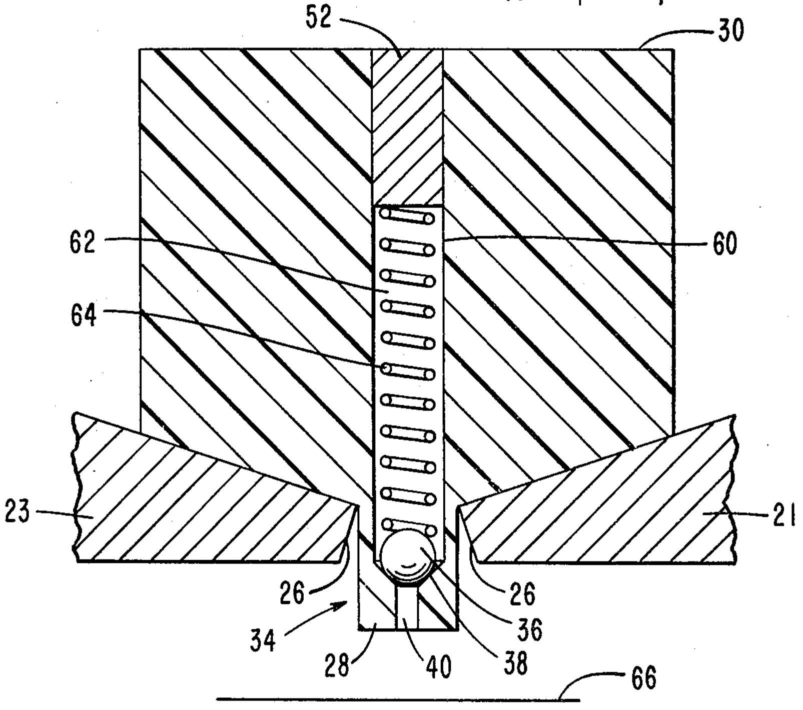
FIG. 4 is an enlarged cross-sectional view of the valve assembly taken along the line 4—4 of FIG. 3.

Valve means, better shown in FIGS. 3 and 4 and generally designated as 34, includes a ball 36 of magnetic material and a seat 38 formed in the nose portion 28 of the housing 30 which seat adjoins and is connected with an aperture 40 in the nose portion. Ink is supplied at greater than ambient pressure by suitable means (not shown) through an inlet tube 58 entering the top of the transducer to a cylindrical cavity 60 formed in the housing member 30. The cavity 60 is closed at one end thereof by a plug 52 and contains the ink 62 for use in the ink jet transducer or print head. The ball 36 is surrounded by ink 62 in the cavity 60 and is preloaded by a light coil spring 64 which urges the ball onto the seat 38 in the nature of a check valve. The pole faces 26 (FIG. 4) are located relative to the seated ball 36 in such position that, when the magnet is energized, the resulting magnetic force acting on the ball is along the central axis of the cavity 60 in a direction tending to lift the ball directly off the seat 38.

In the operation of the ink jet transducer of the present invention, the pressurized ink 62 is gated into droplets on demand by the action of the electromagnet operating on the miniature check valve 34. In a stand-by or non-printing condition, the ball 36 is pressed against the seat 38 by means of hydraulic pressure exerted on the ink flowing through the inlet tube 58 and also by action of the miniature coil spring 64 to form a seal against leakage or flow of ink from the cavity 60 through the nozzle 40. When the coil 32 is pulsed, a momentary magnetic field is generated in the vicinity of the poles 26 and the ball 36 experiences a magnetic force in opposition to the forces of the fluid pressure and the spring 64 of sufficient magnitude to remove the ball from the seat 38.

When the ball 36 is momentarily moved off the seat 38 by reason of the electrical pulse, the ink 62 flows from the chamber 60 around and past the ball 36 and out through the aperture or nozzle 40. The flow of ink 62 past the ball 36 produces a drag force on the ball due to the combined action of the ink viscosity and pressure distribution that returns the ball to the seat 38 at the end of the pulse. During the brief period of time that the ball 36 is unseated, the mass of ink fluid which is ideally a single droplet 65 of the ink 62 is caused to travel along the axis and out the nozzle 40 to impact onto the record media 66.

Figure 5:
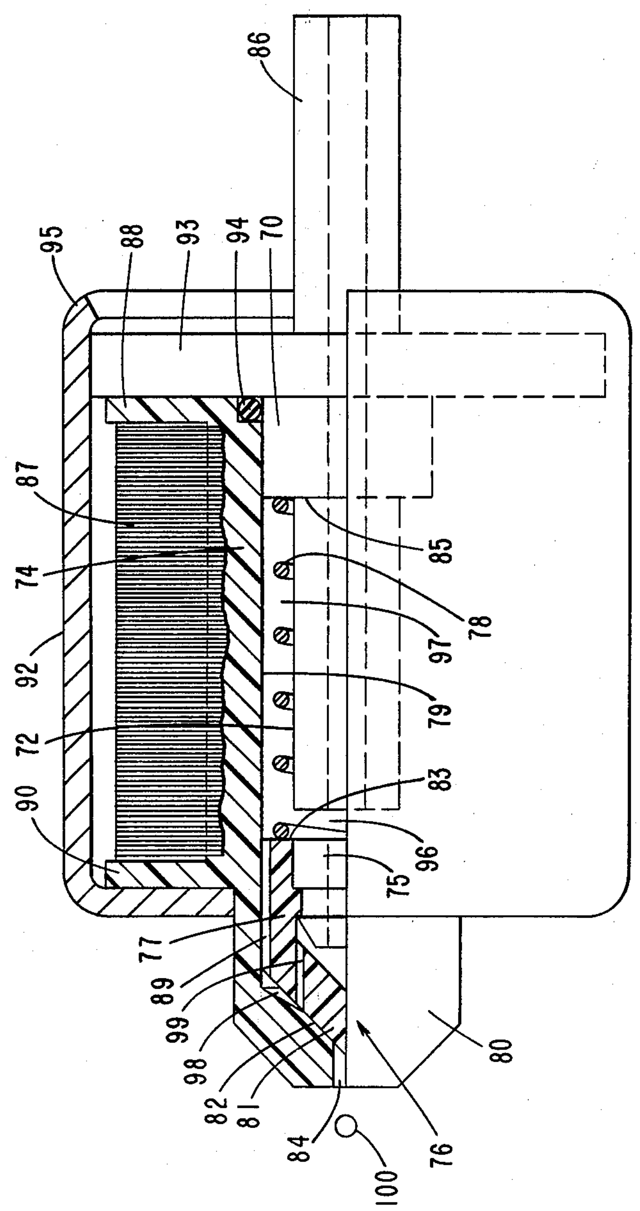
FIG. 5 is a quarter-section view of a modification of the valve assembly.

An alternate realization of ink jet transducer of axially-symmetric design is shown in the modification of FIG. 5 wherein a central member 70 of magnetic material includes a core 72 which is insertably assembled within a valve housing 74. The valve housing 74 is made of non-magnetic material and encloses a plunger, generally designated 76, and a compression spring 78 which encircles the core 72 and is held in contained manner between a surface of the member 70 and the plunger 76. The nose portion 80 of the valve housing 74 provides a conical valve seat 82 adjoining and connecting with an orifice or ink jet nozzle 84. The chamber formed by the core 72 and the valve housing 74 is filled with ink 97 supplied through the hollow core member 86 and the ink provides for immersing the plunger 76 and the spring 78. The valve housing 74 also serves as a bobbin for the magnet wire or coil 87 by reason of the addition of flanges 88 and 90. A cupped outer shell 92 of magnetic material retains the assembly and completes the outer portion of the magnetic circuit from a core flange 93 forward to the region surrounding the plunger 76. The shell 92 may be crimped as at 95 to the core flange 93, and a ring seal 94 is compressed within the annular space surrounding the member 70 upon assembly and constitutes a seal against ink leakage.

The plunger assembly 76 consists of a magnetic inner portion 75 which is pressed or snap-fitted into a lightweight, non-magnetic, cone-tipped cylindrical member 77 which, upon assembly, is slidably located within the bore 79 of the valve housing 74. The conical nose 81 of the plunger 76 mates with the conical valve seat 82 of the nose portion 80 of the housing 74 to form an ink seal when unactuated or in the normally deenergized state. The sealing force is provided by hydrostatic pressure augmented by spring force derived from compression of the spring 78 installed between a base surface 83 of the plunger 76 and a shoulder 85 provided on the central member 70. The magnetic air gap 96 between the base surface 83 and one end of the core 72 sets an upper limit to plunger travel. Two or more longitudinal slots 89 are provided in the outer or peripheral portion of the member 77 to allow unimpeded flow of the ink 97 from the main cavity or chamber and past the plunger 76 to the forward cavity 98. Added channels for this purpose may be provided by adding two or more holes through the plunger shell such as longitudinal hole 99.

In the modified device shown in FIG. 5, when an electrical pulse is applied to the coil 87, the plunger 76 is attracted toward the core 72 of the central member 70, thereby opening the valve and allowing fluid under pressure to occupy the increasing space between the conical tip 81 of the valve and the valve seat 82 and to flow out the nozzle 84. Termination of the pulse allows the spring 78 along with the force on the pressurized ink 97 to reseat the plunger 76, producing a "squishing" effect between mating conical surfaces and accelerating the fluid column exiting the nozzle 84 so as to generate a high speed droplet 100 which forms by surface tension when free of the nozzle.

It is thus seen that herein shown and described is an ink jet transducer wherein electromagnetic means is utilized for moving a ball valve or plunger from a seated or closed position for allowing droplets of ink to be ejected from a nozzle or orifice onto record media. The arrangement enables the accomplishment of the objects and advantages mentioned above, and while a preferred embodiment and a modification thereto have been disclosed herein, other variations may occur to those skilled in the art. It is contemplated that all such variations and modifications not departing from the spirit and scope of the invention hereof, are to be construed in accordance with the following claims.

I claim:

1. An ink jet printing element comprising a
housing having a nozzle at one end thereof,
means for supplying ink into said housing,
valve means including a sloping seat portion formed at one end of the nozzle and a valve member operably associated with the seat portion, and
electromagnetic means including opposed magnetic pole portions positioned for actuating said valve member to open said valve means and allow ejection of droplets of ink from said nozzle.

2. The printing element of claim 1 including spring means biasing said valve member at said nozzle.

3. The printing element of claim 1 wherein said valve member comprises a ball of magnetic material.

4. An ink jet transducer comprising a
body having an inlet port and a nozzle,
valve means including a sloping seat portion formed at one end of the nozzle and a valve member within said body and operably associated with the seat portion,
means for supplying ink under pressure into said body, and
electromagnetic means including a pair of opposed magnetic pole portions positioned for actuating said valve member against the pressure of the ink to open said valve means and permit the release of droplets of ink on demand from said nozzle.

5. The transducer of claim 4 including spring means biasing said valve member at said nozzle.

6. The transducer of claim 4 wherein said valve member comprises a ball of magnetic material.

7. The transducer of claim 4 wherein the electromagnetic means comprises a magnetic frame and a coil for actuating said valve member.

* * * * *